(12) United States Patent
Carrasquillo

(10) Patent No.: US 8,061,515 B2
(45) Date of Patent: Nov. 22, 2011

(54) COMPACT DISC STORAGE AND PROTECTIVE ENCLOSURE

(76) Inventor: Michael Carrasquillo, Oviedo, FL (US)

( * ) Notice: Subject to any disclaimer, the term of this patent is extended or adjusted under 35 U.S.C. 154(b) by 0 days.

(21) Appl. No.: 12/708,982

(22) Filed: Feb. 19, 2010

(65) Prior Publication Data

US 2011/0203951 A1    Aug. 25, 2011

(51) Int. Cl.
B65D 85/57    (2006.01)
(52) U.S. Cl. .................................................. 206/312
(58) Field of Classification Search ............. 206/308.1, 206/308.3, 311, 312, 313, 784, 525.1
See application file for complete search history.

(56) References Cited

U.S. PATENT DOCUMENTS

| | | | | |
|---|---|---|---|---|
| 5,219,417 A * | 6/1993 | O'Brien et al. | ............ | 206/308.1 |
| 5,248,032 A * | 9/1993 | Sheu et al. | ................. | 206/308.1 |
| 5,593,030 A * | 1/1997 | Tell | ............................. | 206/308.1 |
| 5,647,482 A * | 7/1997 | Kleinfelder | ................ | 206/308.1 |
| 5,749,463 A * | 5/1998 | Collins | ....................... | 206/308.1 |
| 5,772,022 A * | 6/1998 | Renna | ........................... | 206/312 |
| 5,803,250 A * | 9/1998 | Mori | ............................ | 206/308.1 |
| 5,823,333 A * | 10/1998 | Mori | ............................ | 206/308.1 |
| 6,298,985 B1 * | 10/2001 | Mathias | ...................... | 206/308.1 |
| 6,523,683 B1 | 2/2003 | Fraser et al. | | |
| 6,612,433 B2 * | 9/2003 | McKenzie | ................. | 206/308.1 |
| 7,080,731 B2 | 7/2006 | O'Brien et al. | | |
| 7,267,226 B2 | 9/2007 | Cananzey | | |
| 7,780,001 B2 * | 8/2010 | Seko | ............................. | 206/312 |
| 2002/0020643 A1 * | 2/2002 | Kleine-Moellhoff | ......... | 206/310 |
| 2006/0042968 A1 * | 3/2006 | Goldberg | ...................... | 206/232 |
| 2006/0175211 A1 | 8/2006 | Intveen | | |
| 2008/0017535 A1 | 1/2008 | Taylor | | |
| 2010/0000891 A1 * | 1/2010 | Woodhead et al. | ......... | 206/308.1 |
| 2010/0089777 A1 * | 4/2010 | Hong | ........................... | 206/308.1 |
| 2010/0307937 A1 * | 12/2010 | Jensen et al. | ............... | 206/308.1 |

* cited by examiner

Primary Examiner — Jacob K Ackun
(74) Attorney, Agent, or Firm — Daniel Law Offices, P.A.; Jason T. Daniel, Esq.

(57) ABSTRACT

A compact disc storage and protective enclosure for securely positioning a disc having a flat circular shape. The enclosure incorporates a unitary element comprising of a single piece of durable and flexible material having a back section, a left section that folds across the back section, a right section that folds across both the left and back sections, a bottom section that folds across both the right and left sections, and a top section that folds across the bottom section. A disc is positioned within the enclosure that also includes a gap having a convex shape into which each of the left and right sections can flex in order to absorb an impact.

14 Claims, 5 Drawing Sheets

COMPACT DISC STORAGE AND PROTECTIVE ENCLOSURE

BACKGROUND

1. Field of the Invention

The present invention relates generally to a protective enclosure for portable media such as a Compact Disc (CD) or other similar type of recording media.

2. Description of the Related Art

CD's and DVD's are among the most common medium for storing and transporting data from one location to another. Whether they contain music, movies or software, these discs are utilized by virtually every industry imaginable. Because data is written on the outside of a CD (and other such media), these discs can easily become scratched or damaged when dropped or impacted by foreign objects. Traditionally, packaging containers for CD's have come in two varieties which include the hard "jewel box" design and the soft "sleeve" design.

Jewel box containers typically comprise a cover manufactured of transparent plastic material as well as a hard plastic base for holding the disc in place. Typically, one end of the cover is attached to the base via a hinge, while the other end is secured to the base via a clip or other securing means, thus allowing the cover to be opened and closed at will. For instance, U.S. Pat. No. 5,101,971 describes a storage holder having a rigid base and cover. However, traditional designs utilizing all rigid materials have drawbacks owing to the expense, weight and durability of the material. As such, recent designs have focused incorporating the use of lower cost materials into the traditional design. For instance, U.S. Pat. No. 6,079,557; U.S. Pat. No. 6,283,286; and U.S. Patent Publication No. 2008-0017535 describe containers that utilize a traditional hard plastic base that is paired with a cover constructed from less expensive material, such as a light plastic flap or a paper covering. However, the financial and environmental costs associated with producing packaging of this type remain high due to the use of several different non-biodegradable materials such as injection molded plastic, composites and adhesive materials. Moreover, there remains a problem wherein the less expensive covers provide no protection to the disc against impact and oftentimes, the cover will separate from the base when the container is dropped, causing the disc to become dislodged which can result in damage to the disc.

Alternatively, sleeve packages are inexpensive to manufacture and typically comprise a lightweight paper material having a pocket into which the disc is inserted. Several examples include: U.S. Pat. No. 5,662,217; U.S. Pat. No. 5,154,284; U.S. Pat. No. 6,227,364; U.S. Pat. No. 6,494,319; and U.S. Pat. No. 7,267,226. Although these containers are lightweight and are at least partly biodegradable, there is a problem in which they provide virtually no protection against impact or pressure, provide little internal support for the disc and will quickly disintegrate when exposed to sufficient moisture. Moreover, any artwork or content list which typically accompanies the disc must be reproduced on the outside of the sleeve, thus increasing production costs and producing additional waste.

Accordingly, it would be beneficial to provide an improved disc package having a unitary design which is lightweight, biodegradable, moisture resistant and resistant to impact. It is also an objective of the invention to provide a disc enclosure which is simple to use and economical to manufacture.

SUMMARY OF THE INVENTION

The present invention is directed to a protective device for securely enclosing a disc having a flat circular shape. One embodiment of the present invention can include a durable and flexible base member having a back section, a left section configured to fold across a portion of the back section, a right section configured to fold across a portion of both the left and back sections, a bottom section configured to fold across a portion of both the right and left sections, and a top section configured to fold across a portion of the bottom section. The protective enclosure can further include a gap having a convex shape into which each of the left and right sections can flex in order to absorb an impact.

Another embodiment of the present invention can include a method for manufacturing a protective enclosure.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

As used throughout this disclosure, a disc can include, for example, a CD, DVD, laser, optical or other similar device. Such discs are well known and typically include a circular body with a spindle receiving hole positioned in the center, a recording surface on a first side, and a non-recording surface on a second side.

Figure 1:
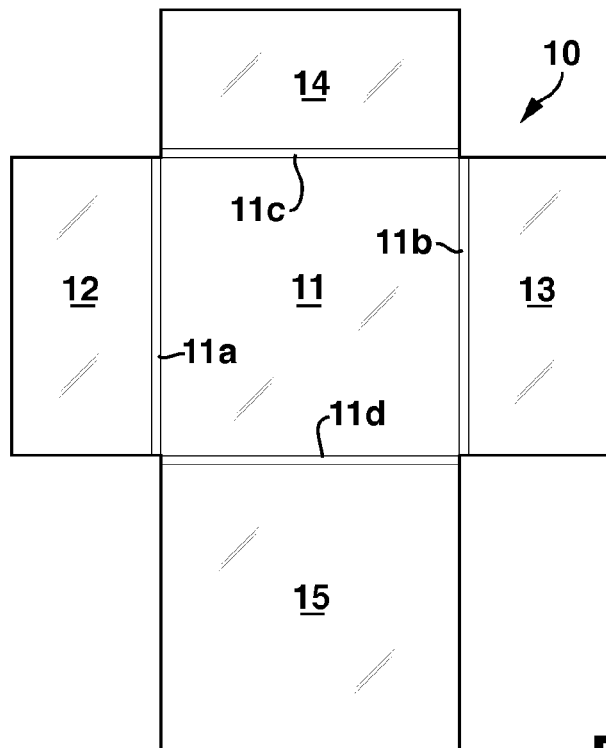
FIG. 1 illustrates one embodiment of a disc storage and protective enclosure that is useful for understanding the embodiments disclosed herein.

FIG. 1 illustrates one embodiment of a disc storage and protective enclosure that is useful for understanding the embodiments disclosed herein. As shown, the protective enclosure 10 can be constructed from a base pattern cut from a single piece of lightweight flexible material. The base pattern can be shaped to include back panel 11 comprising bends 11*a*-11*d*, side panels 12 and 13, top panel 14 and bottom panel 15.

Figure 2:
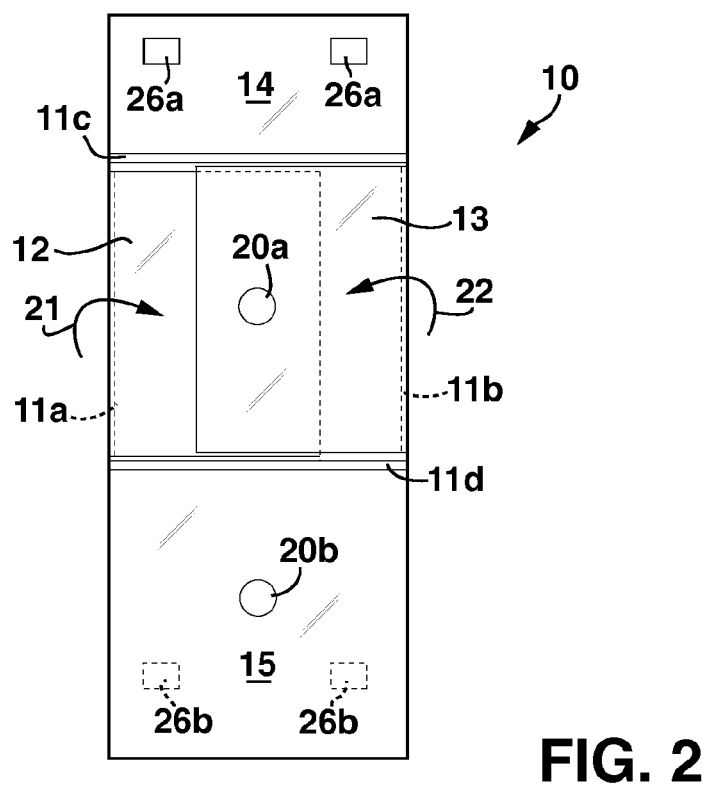
FIG. 2 is a front view illustrating one embodiment of the invention.

As illustrated by FIG. 2, side panel 12 can bend atop the front of back panel 11 via fold 11*a* (see arrow 21) so that side panel 12 overlaps approximately 60-90% of the surface area of back panel 11. Likewise, side panel 13 can bend atop both back panel 11 and side panel 12 via fold 11*b* (see arrow 22) such that side panel 13 overlaps approximately 50-80% of the surface area of side panel 12. As shown, a securing means 20 for securely positioning a disc within the enclosure can also be included. To this end, side panel 13 can include one half of the securing means 20*a* and bottom panel 15 can include the other half of the securing means 20*b*.

Figure 3:
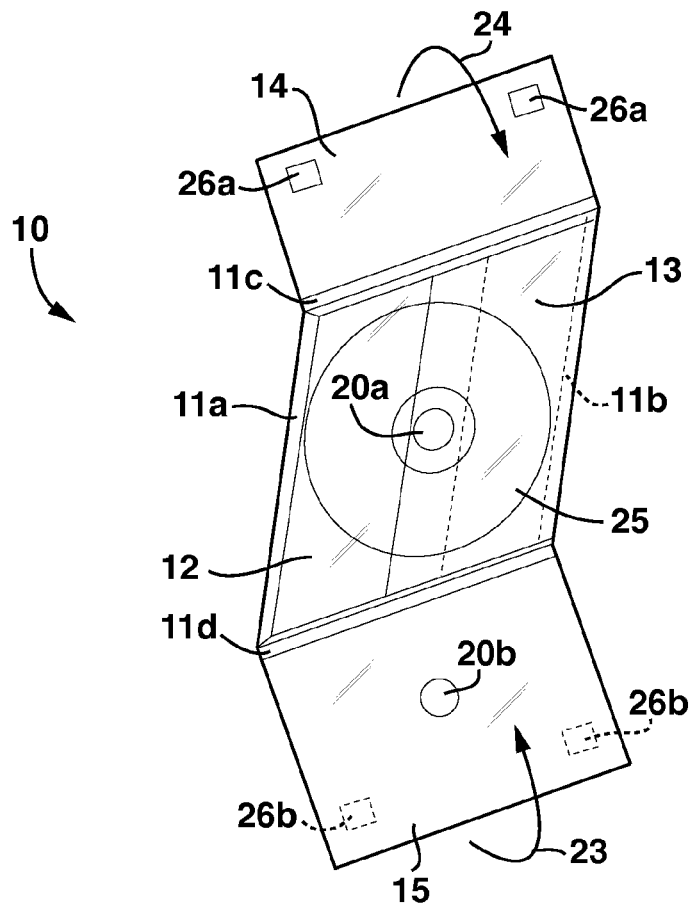
FIG. 3 is a perspective view illustrating one embodiment of the invention.
Figure 4:
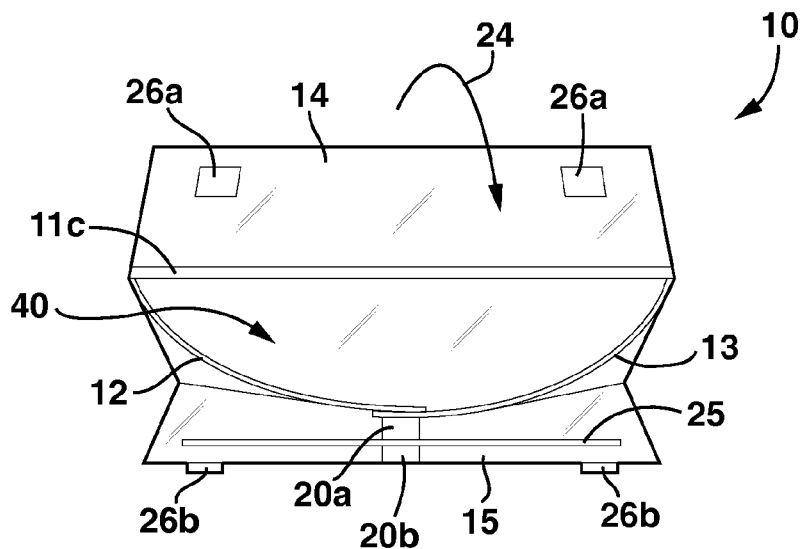
FIG. 4 is a top view illustrating one embodiment of the invention.

As illustrated in FIGS. 3 and 4, once disc 25 is positioned onto securing means 20*a*, via the spindle receiving hole, the bottom panel 15 can bend along fold 11*d* (see arrow 23) until securing means 20*a* and 20*b* are aligned and make contact (See FIG. 4). Moreover, when in this position, both side panels 12 and 13 form a flexible outward bow resulting in a convex air gap 40 between the back panel 11 and the side panels 12 and 13. As will be described below in greater detail, gap 40 can act as a barrier to absorb the force of impact when the protective enclosure is dropped or receives an impact from a foreign object. Such a feature can greatly improve the survivability of a disc which is secured within the protective enclosure.

Finally, top panel 14 can bend along fold 11*c* (see arrow 24) so that top panel 14 overlaps approximately 25-50% of the surface area of bottom panel 15. When in this (closed) position, top panel 14 can act to prevent the enclosure from unintentionally opening as well as preventing moisture from entering the enclosure. Moreover, in another embodiment, top panel 14 and bottom panel 15 can further include one or more locking means 26 which can act in a similar manner as the securing means 20 described above. To this end, locking means 26 can provide additional security against unintentional/inadvertent opening of the enclosure. As shown in FIG. 4, one portion of the locking means 26*a* can be positioned on the inside of top panel 14, and another portion of the locking means 26*b* can be positioned on the outside of bottom panel 15 such that elements 26*a* and 26*b* align and engage when top panel 14 is folded across bottom panel 15 (See FIG. 5*a*).

As used herein, the securing means 20 can preferably include magnetic elements and/or strips of Velcro® and the locking means 26 can include a variety of known elements in order to create an attachment point between two objects. Several non limiting examples include: magnetic elements, adhesive material, and compression fittings such as buttons, snaps, and Velcro®, for example. Each of these elements and other similar attachments are known. To this end, it is preferable that elements 20 and 26 be permanently affixed to the protective enclosure 10 via a strong adhesive at the time of manufacture.

In one preferred embodiment, the protective enclosure 10 can comprise a unitary design constructed from a single piece of durable lightweight malleable material. For instance, the protective enclosure 10 can be constructed of for example, recyclable plastic, Cellulose Acetate or another known material that is inexpensive to produce, has excellent water resistance, is flexible, biodegradable and/or recyclable as well as having excellent durability. Additionally, in another preferred embodiment, bends 11*c* and 11*d* can be pre-scored to include a channel having a width ranging from approximately 0.5 centimeters to 1 centimeter in order to maintain the shape of the enclosure. Such channels and their associated uses are well known in the art.

Figure 5A:
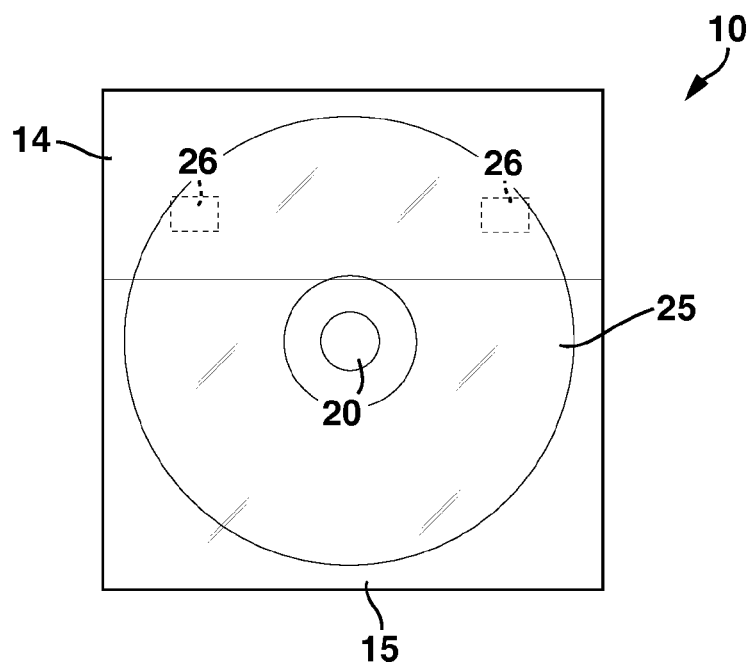
FIG. 5a is a front view illustrating another embodiment of the invention.
Figure 5B:
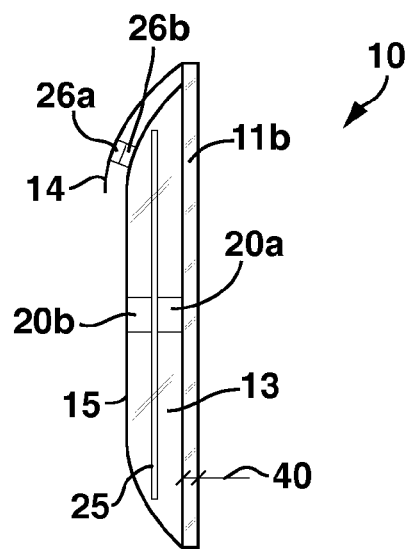
FIG. 5b is a side view illustrating another embodiment of the invention.

As shown in FIGS. 5*a* and 5*b*, the protective enclosure 10, according to one embodiment can act to securely enclose a disc in order to protect the disc from damage resulting from an impact with a foreign object as well as to protect the disc from adverse elements such as water or dust, for example. To this end, when impacted by a foreign object, the side panels 12 and 13 which form an outward bow (see FIG. 4), can bend within the confines of the convex gap 40 in order to absorb the force associated with the impact. In other words, the bowed shape of the side panels 12 and 13, when folded act like a cushion or spring in order to reduce the force of an impact before it can be transferred to the disc. As such, a disc securely positioned within the enclosure can escape damage and the enclosure itself will not inadvertently open.

Figure 6:
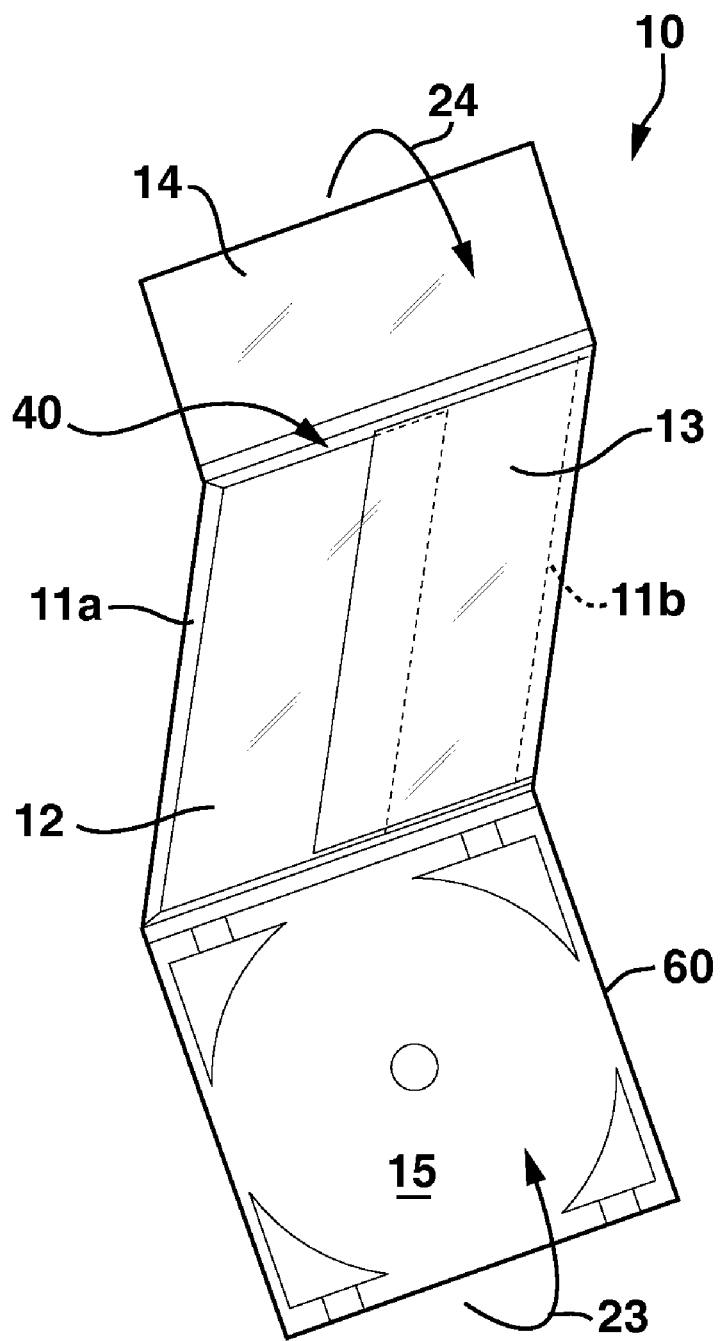
FIG. 6 is a perspective view illustrating an alternate embodiment of the invention.
Figure 7:
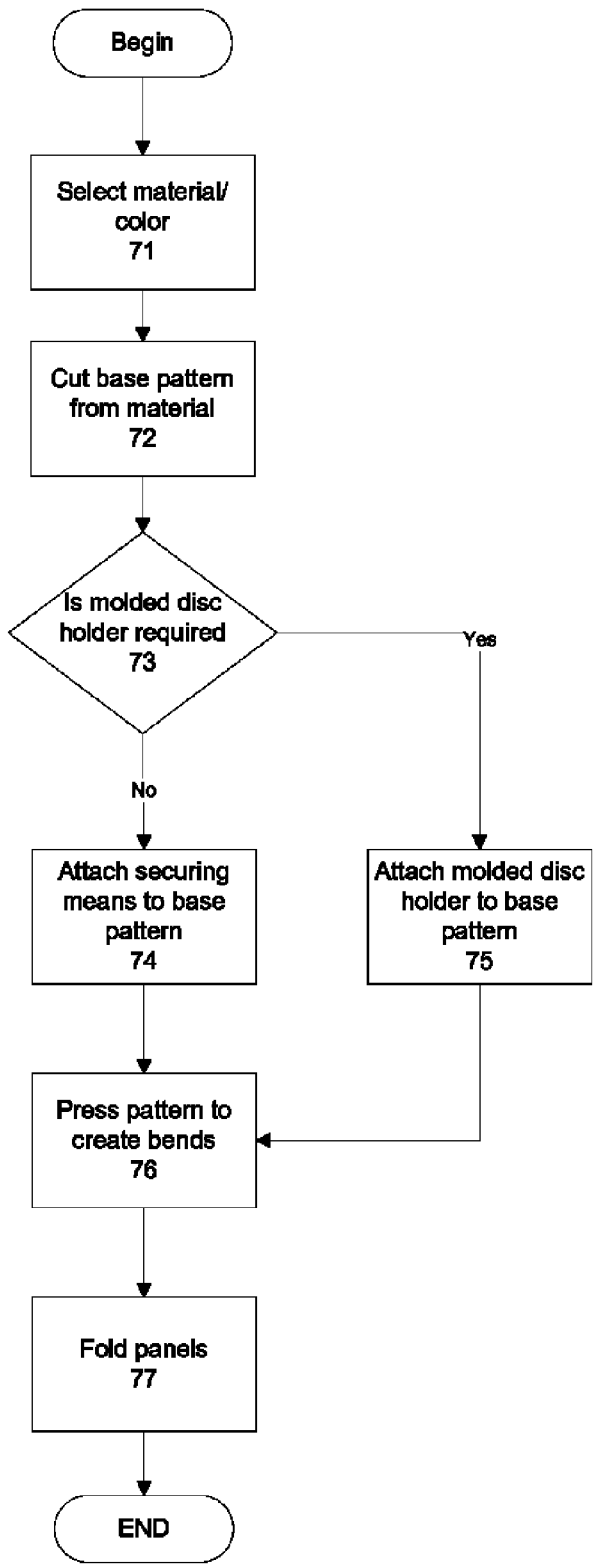
FIG. 7 is a flow chart illustrating a method of manufacturing a disc storage and protective enclosure in accordance with the present invention.

FIG. 6 illustrates an alternative embodiment of a protective enclosure 10 that includes a molded disc holder 60. Disc holders, such as element 60 are well known in the art and can be made from a single piece of injection molded plastic and typically include a hub for securely attaching a disc. As shown, disc holder 60 can be affixed to the inside of bottom panel 15 such that the enclosure 10 can incorporate the rigid disc holder 60 when in a closed position. To this end, such an embodiment can provide additional rigidity to the enclosure while maintaining the novel features described above.

A method of manufacturing a protective enclosure is now described. Method 70 can begin at step 71 where a suitable material and color selection can be made.

In step 72, the base pattern of the protective enclosure can be cut from the material selected in step 71. To this end, a plurality of panels can be formed including back panel 11, side panels 12 and 13, top panel 14 and bottom panel 15, as described above.

In step 73, a determination is made as to whether the protective enclosure is to include a hard molded disc holder. If a disc holder is to be included, the method proceeds to step 75 where the molded disc holder is attached to the back panel 11 and the method then proceeds to step 76.

If, in step 73, a molded disc holder is not to be included, the method proceeds to step 74 where a securing means is selected and attached to the base pattern. As used herein, the securing means incorporates both the means for securing the disc within the enclosure and the means for securely closing (locking) the enclosure, as described above.

In step 76, the base pattern is pressed/formed to create a series of bends (such as bends 11*a*-11*d*) interposed between the back panel and each of the top, bottom and side panels.

In step 77, the panels are folded across the series of bends to create the shape of the protective enclosure in a closed position.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A protective enclosure device for securely positioning a disc having a flat circular shape, a spindle receiving hole and a diameter, said device comprising:
    a durable and flexible base member that includes
        a back panel having a dimension greater than the disc diameter,
        a first side section positioned along a periphery of the back panel and configured to fold horizontally across a portion of the back panel,
        a second side section positioned along a periphery of the back panel opposite to said first side section, said second side section being configured to fold horizontally across a portion of both the back panel and a portion of the first side section,
        the first and second side sections being further configured to overlap across a center section of the back panel, thus forming a flexible outward bow, and a convex air gap extending from the overlapped side sections to the back panel;
    a bottom section configured to fold across a portion of both the first and second side sections; and
    a top section configured to fold across a portion of the bottom section.

2. The protective enclosure device of claim 1 wherein said first and second side sections are configured to flex within the convex gap to absorb an impact.

3. The protective enclosure device of claim 1 further comprising:
    means for securing the disc to one or more of the first, second and bottom sections of the device.

4. The protective enclosure device of claim 1 further comprising:
    a disc securing unit configured to securely position the disc within the enclosure, said securing unit including a first connection member affixed to a portion of at least one side section, and a second connection member affixed to an inside portion of the bottom section,
    said first and second connection members being configured to engage through the spindle receiving hole of the disc when the bottom section is in a folded position.

5. The protective enclosure device of claim 4, wherein said disc securing unit includes at least one of magnetic elements, and hook and loop fasteners.

6. The protective enclosure device of claim 1 further comprising:
    means for locking the device in a folded position.

7. The protective enclosure device of claim 1 further comprising:
    a locking unit configured to prevent the protective enclosure from opening, said locking unit including at least one first locking member affixed to a portion of the top section, and at least one second locking member affixed to an outside portion of the bottom section,
    said first and second locking members being configured to engage when the top is in a folded position.

8. The protective enclosure device of claim 7, wherein said locking unit includes at least one of a magnetic elements, adhesive material, and compression fittings.

9. The protective enclosure device of claim 1 further comprising:
    a rigid disc securing unit having a dimension equal to the diameter of the back section, said rigid unit being affixed to said back section.

10. The protective enclosure device of claim 1 wherein said device is waterproof.

11. The protective enclosure device of claim 1 wherein said device is biodegradable.

12. The protective enclosure device of claim 1 wherein said base member includes a Cellulose Acetate material.

13. A protective enclosure device for securely positioning a disc having a flat circular shape, a spindle receiving hole and a diameter, said device comprising:
    a base member constructed from a single piece of flexible waterproof material, said base member including
        a back panel having a dimension greater than the disc diameter,
        a first side section configured to fold horizontally across a portion of the back panel,
        a second side section configured to fold horizontally across a portion of both the back panel and a portion of the first side section,
        the first and second side sections being configured to overlap across a center section of the back panel, thus forming a flexible outward bow, and a convex air gap extending from the overlapped side sections to the back panel;
    a bottom section having an inside surface and an outside surface,
        wherein said bottom section is configured to fold across a portion of both the first and second side sections;
    a disc retention hub permanently secured to the inside surface of the bottom section, said retention hub being configured to secure the disc to the device; and
    a top section configured to fold across a portion of the outside surface of the bottom section.

14. The device of claim 13 wherein said base member further includes a plurality of pre-scored bends interposed between the back panel and each of said back, top, first and second side sections.

* * * * *